United States Patent
Deng et al.

(10) Patent No.: US 8,566,076 B2
(45) Date of Patent: Oct. 22, 2013

(54) SYSTEM AND METHOD FOR APPLYING BRIDGING MODELS FOR ROBUST AND EFFICIENT SPEECH TO SPEECH TRANSLATION

(75) Inventors: Yonggang Deng, Yorktown Heights, NY (US); Yuqing Gao, Mount Kisco, NY (US); Bing Xiang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1194 days.

(21) Appl. No.: 12/128,199

(22) Filed: May 28, 2008

(65) Prior Publication Data

US 2009/0299724 A1   Dec. 3, 2009

(51) Int. Cl.
*G06F 17/28* (2006.01)

(52) U.S. Cl.
USPC .................................. 704/2; 704/3; 704/5

(58) Field of Classification Search
None
See application file for complete search history.

(56) References Cited

U.S. PATENT DOCUMENTS

| | | | |
|---|---|---|---|
| 5,956,668 A * | 9/1999 | Alshawi et al. | 704/2 |
| 6,278,968 B1 * | 8/2001 | Franz et al. | 704/3 |
| 6,556,972 B1 | 4/2003 | Bakis et al. | 704/277 |
| 6,581,034 B1 * | 6/2003 | Choi et al. | 704/238 |
| 7,016,835 B2 | 3/2006 | Eide et al. | |
| 7,016,849 B2 | 3/2006 | Arnold et al. | |
| 7,236,922 B2 | 6/2007 | Honda et al. | |
| 7,346,515 B2 * | 3/2008 | Mizutani et al. | 704/277 |
| 2003/0187643 A1 * | 10/2003 | Van Thong et al. | 704/254 |
| 2003/0200091 A1 * | 10/2003 | Furuyama et al. | 704/254 |
| 2006/0116877 A1 * | 6/2006 | Pickering et al. | 704/231 |
| 2007/0016401 A1 * | 1/2007 | Ehsani et al. | 704/9 |
| 2007/0042567 A1 | 2/2007 | Koyata et al. | |
| 2007/0271088 A1 | 11/2007 | Waibel et al. | |
| 2008/0004858 A1 | 1/2008 | Gao et al. | |

OTHER PUBLICATIONS

Wahlster, Wolfgang. "Robust Translation of Spontaneous Speech: A Multi-Engine Approach". In: Proc. of the 17th Intl. Joint Conference on Artificial Intelligence. Aug. 2001, vol. 2 pp. 1484-1493.*
Ruland et al. "Making the Most of Multiplicity: A Multi-Parser Multi-Strategy Architecture for the Robust Processing of Spoken Language". In Proc. of the 1998 International Conference on Spoken Language Processing.*
Bertoldi et al.; A New Decoder for Spoken Language Translation Based on Confusion Networks; Proceedings of IEEE Workshop on automatic Speech Recognition and Understanding; 2005; pp. 86-91.
Galles; Spider: A High-Speed Network Interconnect; IEEE Micro; 1997; pp. 34-39.
Lease et al.; Recognizing Disfluencies in Conversational Speech; IEEE Transactions on Audio, Speech and Language Processing; Sep. 2006; pp. 1566-1573.
Matusov et al.; Integrating Speech Recognition and Machine Translation: Where Do We Stand?; Proceedings of IEEE International Conference on Acoustics, Speech and Signal Processing; vol. 5; May 2006; pp. V 1217-V 1220.
Stallard et al., The BBN 2007 Displayless English/Iraqi Speech-to-Speech Translation System; Proceeding of Interspeech 2007; Antwerp Belgium; 2007; pp. 2817-2829.

* cited by examiner

*Primary Examiner* — Jesse Pullias
(74) *Attorney, Agent, or Firm* — Tutunjian & Bitetto, P.C.; Anne V. Dougherty

(57) ABSTRACT

A system and method for speech translation includes a bridge module connected between a first component and a second component. The bridge module includes a transformation model configured to receive an original hypothesis output from a first component. The transformation model has one or more transformation features configured to transform the original hypothesis into a new hypothesis that is more easily translated by the second component.

25 Claims, 4 Drawing Sheets

SYSTEM AND METHOD FOR APPLYING BRIDGING MODELS FOR ROBUST AND EFFICIENT SPEECH TO SPEECH TRANSLATION

GOVERNMENT RIGHTS

This invention was made with Government support under Contract No.: NBCH2030001 awarded by the Defense Advanced Research Projects Agency (DARPA). The Government has certain rights in this invention.

BACKGROUND

1. Technical Field

The present invention relates to speech recognition and more particularly to systems and methods that employ bridging models to improve interaction between separately optimized speech translation components.

2. Description of the Related Art

State-of-the-art speech-to-speech (S2S) translation is usually implemented as a cascaded system connecting different modules including automatic speech recognition (ASR), machine translation (MT) and text to speech (TTS) modules. Simply cascading these modules sequentially is far from optimal. Different modules are typically built independently and optimized separately. However, robust and efficient end-to-end system performance is needed.

To further illustrate, there are problems with MT when simply taking ASR output as an input. ASR is not perfect, especially for speech with accents or under noisy conditions. Errors in the ASR output present clear challenges to MT engines, which are usually very sensitive to disfluency and recognition errors. For example, imagine "what incident occurred" was misrecognized as "white incident occurred". In extreme cases, it takes only one or two misrecognized function/common words to break long phrases that otherwise could have been translated correctly. Consequently the speech-to-speech communication channel can be misinterpreted completely.

Another issue for connecting ASR and MT is mismatch between styles of translation model training data and ASR hypotheses. While translation models are usually estimated from well-structured parallel corpora, ASR hypotheses for speech translation are usually in spontaneous informal spoken form. There will be mismatches between their respective vocabularies as well. For example, there are at least five alternative spelling variations for the common name "Muhammad". It is quite possible that the alternative spelling set in ASR is not a subset of or has no overlap with that of MT.

Similarly, mismatch of vocabulary and training corpora can also occur between MT and TTS. For example, punctuation can provide important clues for prosody information generation. However, speech translation usually has no word duration and punctuation in the MT output.

To improve system robustness, tighter integrations between ASR and MT have been suggested. One approach is to translate top N-best ASR hypotheses rather than the best hypothesis. A machine translation component in this type of solution directly takes the word lattice generated by ASR module as input. Similarly, the ASR produces a word confusion network and sends it to the MT component for translation. The N-best list, word lattice or confusion network provide more information than the single best hypothesis. However, they have been shown to be ineffective in improving the translation system performance and robustness. The variations in the N-best list, word lattice and confusion network are limited by the ASR module. They also significantly increase the MT computation cost.

In building a speech translation system, ASR and MT modules can interact. For example, speech recognition receives feedback from the MT module and then adapts an acoustic model to improve recognition robustness. The feedback for model training/adaptation can be carried out between ASR and MT in offline model training only.

An alternative approach to improve system robustness performs a kind of normalization or transformation on ASR output before sending the output for translation. Speech reconstruction using parsing algorithms were proposed where disfluencies such as short repetitions in ASR hypotheses are targeted to be detected and repaired to generate more grammatically correct output. The goal was to make the ASR output more readable and accessible to human beings and other upstream applications. However, applying parsing techniques are limited for reconstruction since spoken language can be quite informal. Moreover, the parsing techniques usually ignore phonetic clues and do not model translatability directly.

Another approach for transforming ASR hypotheses is called canonicalization, where the ASR output is analyzed and canonicalized into one of many predefined semantically structured formats where human translations are memorized. The usefulness of this method is limited in free-form speech translation. The method can only handle limited variances of finite templates.

Similar to canonicalization, speech translation systems may have a database of sentence lists, e.g., having frequently spoken sentences/phrases, where human translations are memorized. Given an ASR hypothesis, an information retrieval method is applied to identify those sentences in the database that are similar to the ASR output. Users are directed to select the ASR output together with retrieved similar sentences in the database. Like canonicalization, this method is also limited by the database.

SUMMARY

Speech-to-speech translation facilitates communication between human beings who speak different languages. A joint optimization of components is necessary for efficient and robust concept transfer between end users. The above-mentioned background does not address mismatch between separately optimized modules. In particular, no specific techniques are proposed to directly handle translatability and translation reliability issues of ASR output in general in the presence of recognition errors.

A system and method for speech translation includes a bridge module connected between a first component and a second component. The bridge module includes a transformation model configured to receive an original hypothesis output from a first component. The transformation model has one or more transformation features configured to transform the original hypothesis into a new hypothesis that is more easily translated by the second component.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
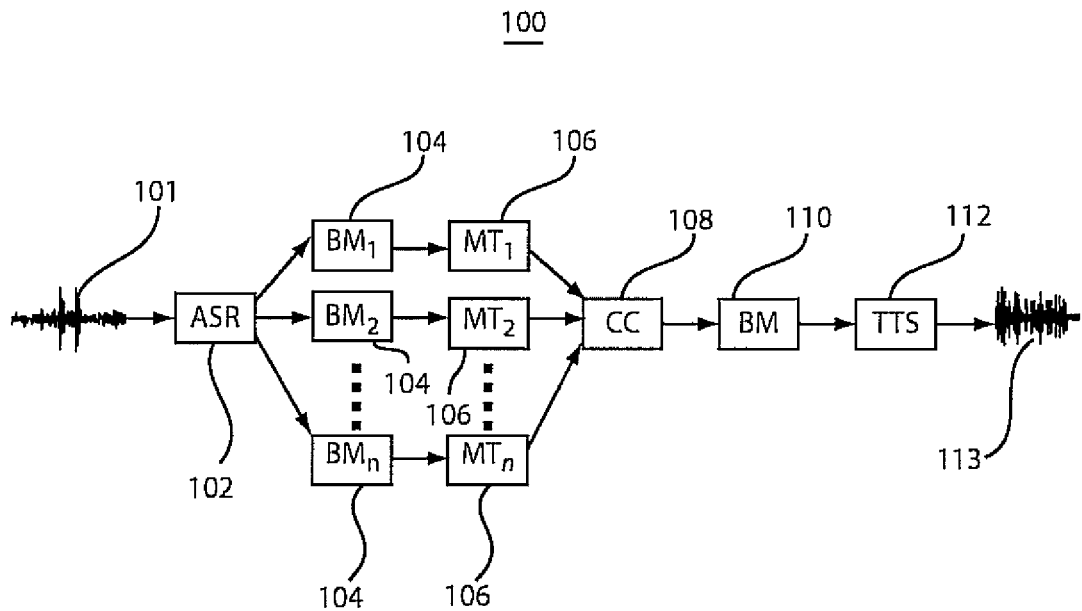
FIG. 1 is a block/flow diagram of a speech-to-speech translation system/method with bridging modules in accordance with the present principles.

In accordance with the present principles, a joint optimization of components is provided for efficient and robust concept transfer between end users. The present principles address mismatch between separately optimized modules to directly handle translatability and translation reliability issues of automatic speech recognition (ASR) output in the presence of recognition errors.

In one embodiment, bridging modules (BM) are included to handle mismatches between components. In particular, a bridging module connects the ASR and a machine translation module (MT). When there are multiple MT modules, separate bridging modules may be needed for each MT engine. A bridging module analyzes ASR hypotheses, performs automatic normalization with knowledge of what can be translated and how reliable the hypotheses can be translated in the following MT module, and then sends the hypotheses to the MT module for translation. A function or model of the bridging module in one application may be referred to as ASR Output Transformation for Translation (ASROTT). One goal is to improve ASR output readability and more importantly make it easier for translation engines. ASROTT transforms speech recognition output into alternative hypotheses that are preferably (a) phonetically similar to the original hypotheses; (b) grammatically correct and semantically meaningful so that the hypotheses will be more accessible to human beings; and (c) easier to translate for the MT engine.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Systems as described herein may include or may be fabricated as part of the design for an integrated circuit chip or chips. The resulting integrated circuit chips can be mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, an illustrative system 100 shows speech-to-speech translation in accordance with the present principles. Speech-to-speech translation facilitates communication between people speaking different languages. System 100 provides a joint optimization of components for efficient and robust concept transfer between end users. System 100 addresses mismatch between separately optimized modules to directly handle translatability and translation reliability issues.

An automatic speech recognition (ASR) module 102 is coupled to bridging modules (BM) 104 to handle mismatch between the ASR 102 and machine translation (MT) components 106. Input speech 101 in a first language is recognized using ASR 102. Bridging modules 104 receive the ASR (102) output and connect the ASR 102 and MT 104 modules.

In the illustrative example, of FIG. 1, there are multiple MT modules 106; therefore, separate bridging modules 104 are employed for each MT engine 106. Bridging modules 104 analyze ASR hypotheses, perform automatic normalization with knowledge of what can be translated and determine how reliably the hypotheses can be translated in the following MT module 106. Then, the bridging module 104 outputs to the MT module 106 for translation.

The bridging module 104 provides a transformation model, in this example, an ASR Output Transformation for Translation (ASROTT) to improve ASR output readability and make it easier for translation engines. ASROTT transforms the speech recognition output into alternative hypotheses that are (a) phonetically similar to the original hypotheses; (b) grammatically correct and semantically meaningful so that the hypotheses will be more accessible to human beings; and (c) easier to translate for the MT engine 106. ASROTT can be used in the S2S translation system 100 as implemented by bridging modules 104 between ASR 102 and MT 104.

In addition, a bridging module may be employed between other components as well. For example, a bridging module 110 is employed between a combining component (CC) 108 and a text to speech module 112. The TTS module 112 outputs speech 113, e.g., in a different language from the input language 101.

Figure 2:
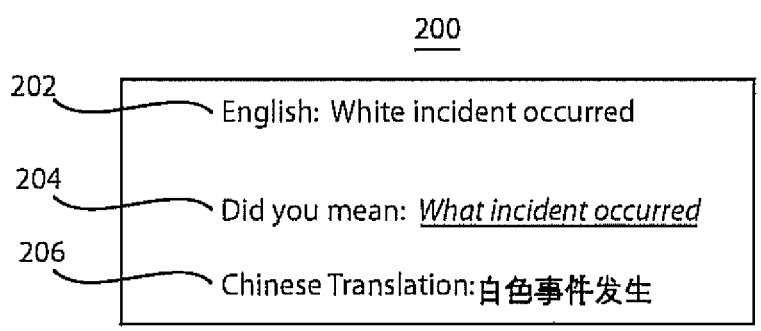
FIG. 2 is an illustrative example of a transformation application to further demonstrate the present principles.

Referring to FIG. 2, bridging modules may be analogized to a "did you mean?" application. It is often the case, that a user of a search tool enters incorrectly spelled words. The searching application may be able to assess this fact and even suggest a change (e.g., "did you mean?"). A bridging module can serve the same function as say spelling check suggestions, when users are available to verify/select from options. This function is applicable to any voice-driven dialog system.

In FIG. 2, an application 200 shows an illustrative example to demonstrate the type of function served by a bridging module in accordance with the present principles. An utterance 202 in English is recognized as "White incident occurred". This statement does not make sense in the present context. This is recognized by application 200, which searches for a better hypothesis and, in this example, displays it as, e.g., "Did you mean: What incident occurred" 204. The better hypothesis can then be translated into, e.g., Chinese, to provide translated text 206 in accordance with this application.

in an eyes-free or hands-free speech-to-speech translation scenario, ASROTT can be plugged into the system in a way that is transparent to users. With a confidence measurement, the function can be by-passed when the hypotheses transformation is not supported by enough evidence. In other words, the bridging modules can be by-passed if the confidence in the output is above a threshold.

ASROTT is formulated as a search problem aimed at identifying optimal hypotheses that are not only phonetically similar to ASR output but also can be more easily translated by, e.g., machine translation. A phrase-based log-linear model is applied with multiple features designed to meet the above-mentioned goals. In particularly useful embodiments, the model can be implemented as a Stack or Viterbi decoding process.

Referring again to FIG. 1, when there are multiple translation engines 106, a combining component (CC) 108 may be employed whose output will be sent to TTS 112. It is necessary for transforming the MT output to match TTS training so that the synthesized sound is more natural and intelligible. The bridging module 110 between MT 106 and TTS 112 is employed to provide this task. This can be implemented using, e.g., paraphrasing or other transformations.

Figure 3:
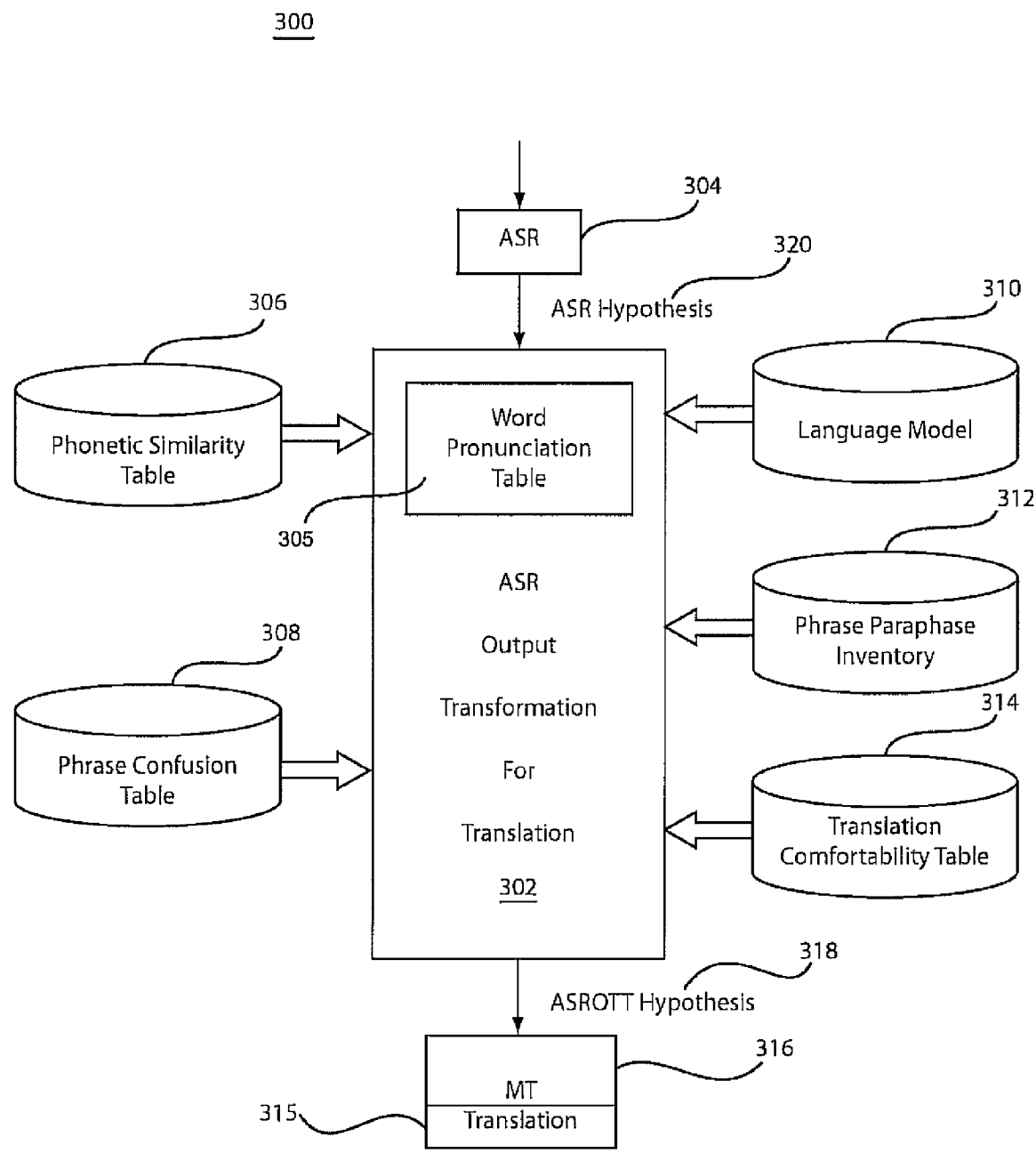
FIG. 3 is a block/flow diagram showing a system/method for speech translation in accordance with one illustrative embodiment.

Referring to FIG. 3, a system/method 300 for translating speech is illustratively shown in accordance with one embodiment. An ASROTT model of bridging module 302 is motivated by human experience in handling uncertainty during communication. When a person hears an utterance that does not make much sense, the person would likely interpret the utterance as one that is not only phonetically similar but also more easily understood, possibly followed by some clarification/confirmation to the other party. ASROTT 302 is formulated as a search problem with the goal of finding a best hypothesis that satisfies the following: (a) it provides a phonetically similar hypotheses to the original hypotheses; (b) it provides a grammatically correct and semantically meaningful hypotheses that is more accessible or understandable to a next component; and (c) the hypotheses are easier to translate for the next component.

The model 302 may be employed between any two or more components. In this example, the ASROTT model 302 is disposed between an automatic speech recognition (ASR) engine 304 and a machine translation (MT) engine 316. The model 302 may employ many tools or applications as will be described hereinafter.

A phonetic similarity table 306 may be employed. The phonetic similarity table 306 quantitatively provides acoustic similarities between two phrases. The table 306 is derived from a pronunciation model 305. Word sequences are replaced by phone sequences by looking them up in a phone dictionary, and then using a phone string edit distance to capture phonetic similarity.

The phonetic similarity table 306 describes how similarly two phones or phone sequences sound using numerical numbers. A higher number indicates two phones or sequences are more phonetically similar. Such a table can be learned from parallel phone sequences, where on one side correct phone sequences are stored and on the other side corresponding recognized phone sequences are stored. By comparing the two sides, using, say, edit distance, one can find out how many times a phone sequence can be recognized as another phone sequence. For example, "w ah" can be misrecognized as "hh w ay".

A phrase confusion table 308 may also be employed. Another way to capture phonetic similarity is by using the phrase confusion table 308. For a given phrase, the table 308 provides all possible phrases that the ASR 304 would recognize and their phrase probabilities. A better performing ASR component will likely have a less ambiguous phrase confusion table 308. The phrase confusion table 308 may be established with a data-driven method. More specifically, acoustic training data is split into two parts. Then, the second part is decoded with models trained from the first part. Similarly, the first part is decoded with models trained from the second part. Comparing the decoding hypotheses with transcriptions, we can estimate a phrase based transformation table with probabilities including entries such as, e.g., "what" is to be recognized as "white" with probability 0.2. Alternatively, a single model may be built over the entire training corpus, but the corpus may be decoded with a much weaker language model, say unigram, to get pairs of hypotheses and transcriptions.

A phrase paraphrase inventory 312 may be provided. Paraphrasing provides alternative ways of expressing the same idea. A collection of phrase paraphrases may be employed to compose ASROTT hypotheses 318 that are semantically consistent with the ASR output but at the same time can be better covered by a translation model 315. The phrase paraphrase inventory 312 is preferably extracted from a parallel corpus and can be augmented from other linguistic resources.

A language model 310, like in speech recognition, can be employed to assign probability to a word sequence. The language model 310 captures word order and dependency. The language model 310 is helpful in generating well-structured sequences. We apply the language model 310 to ASROTT hypotheses 318. A higher order n-gram language model than one used in ASR decoding may be employed.

A language model describes the possibility of observing a word sequence: $P(w_1, w_2, \ldots, w_n)$. The word sequence usually can be decomposed into the product of the probability of predicting the next word given the words observed so far: $P(w_1, w_2, \ldots, w_n) = P(w_1)P(w_2|w_1)P(w_3|w_1, w_2) \ldots P(w_n|w_1, w_2, \ldots, w_{n-1})$ To estimate the probability of the next word given the words observed so far (i.e., a history), usually a collection of sentences is needed. Parameters are estimated by counting how many times a word follows a history. To address the data sparseness issue, words in the history that are far from the word to be predicted are ignored, for example, the word to be predicted is assumed to be dependent only on the previous two words. This is called a tri-gram language model.

A language model is useful in differentiating good word sequences from bad word sequences. For example, a good language model will assign higher probability to "what incident occurred" than to "white incident occurred".

A translation comfortability table 314 may also be employed. Translation comfortability describes how comfortably the NT engine 316 can translate an utterance. An utterance may be segmented into phrases. A phrase translation confidence measurement may be used to model utterance translation comfortability. A phrase translatability confidence metric can be as simple as a 0/1 function indicating whether the phrase has translation entries in the phrase translation table or not, or may include other derivatives from the phrase translation table.

A translation model (315) is usually learned from a collection of sentences and their translation in other languages. Unsupervised methods are employed to find out word links between a sentence pair. After that, phrase translations can be identified from word alignments. Therefore, one can build up an inventory of phrases and their translations in another language with probabilities. Using statistical significance tests, the confidence of a phrase translation can be measured. We can use that confidence score to define a translation comfortability metric of a phrase.

System 300 may include all or some of these features. ASROTT model 302 integrates these features preferably in a log-linear model and uses a Stack or Viterbi decoder similar to that in speech recognition or monotone statistical machine translation to carry out optimal hypotheses searching. It should be understood that additional models or features may be integrated into ASROTT model 302. These features may be component specific models of tables and may include constraints or references to assist in smoothing the transition for signal transitions between components, and in particular components of a speech translation system.

An example showing how ASROTT is carried out with transformation features from different tables will now illustratively be described. Suppose a bridging module or transformation 302 receives a word sequence "white incident occurred" from ASR 304 as output. Bridging module 302 will look at a word pronunciation table 305 and find out the phone sequence for the word "white" as "hh w ay td". By looking up the phonetic similarity table 306, bridging module 302 is aware that "hh w ay" can be misrecognition of "w ah", therefore "hh w ay td" can be transformed as "w ah td", which is the word "what". So the ASR output can be transformed as "what incident occurred". Feature scores from language model 310 and translation comfortability table 314 will favor the alternative since it is more natural when evaluated by the language model 310 and easier to translate when evaluated by translation comfortability table 314.

There may be other alternatives as well. ASROTT will identify all possibilities and examine them by calculating log-linear scores from each feature function. This includes the Stack or Viterbi searching process. Pruning can be applied for transformation speed and efficiency.

Figure 4:
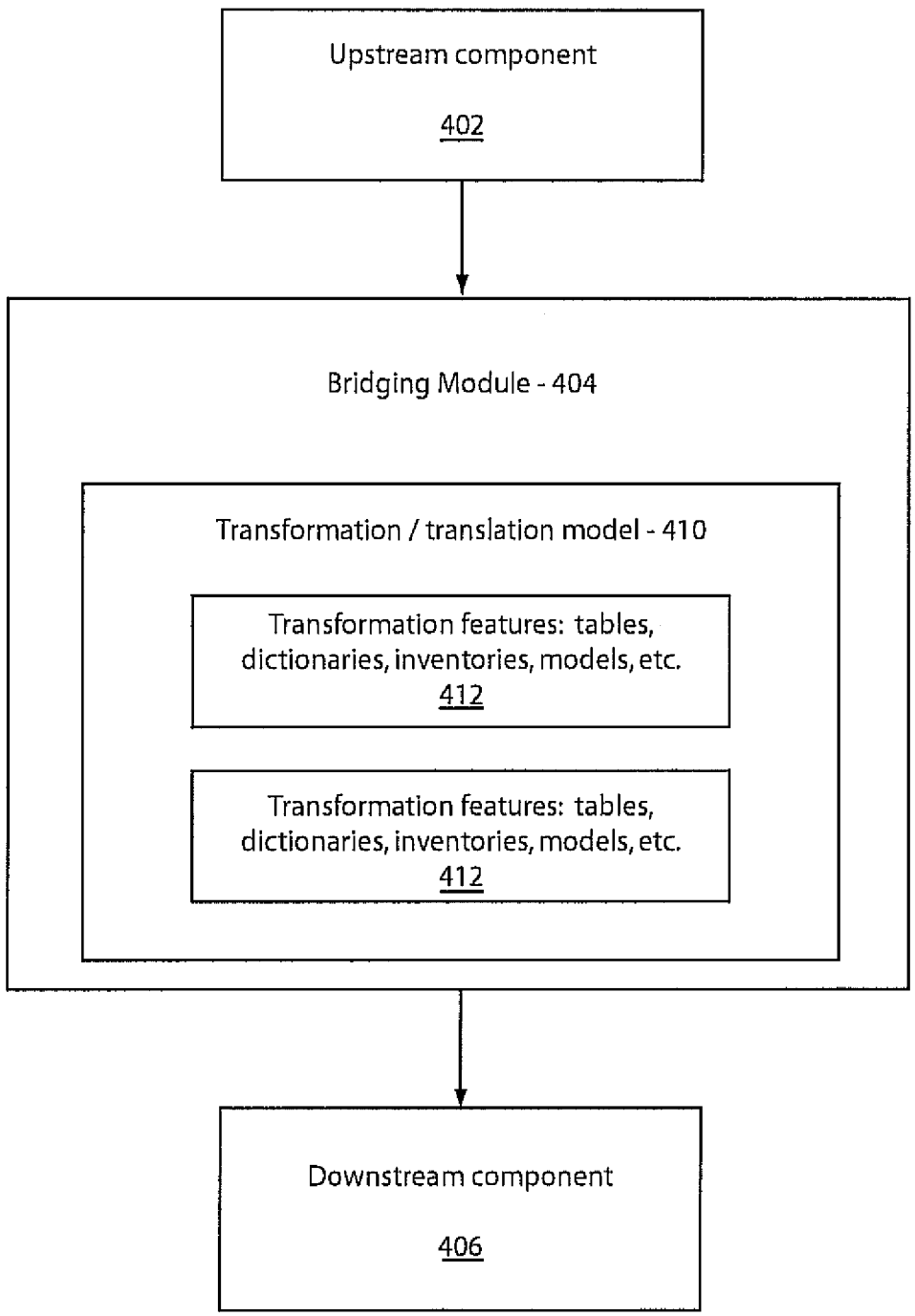
FIG. 4 is a block/flow diagram showing a general embodiment for transforming output signals in accordance with a downstream component.

Referring to FIG. 4, in accordance with the present principles, bridge modules having a transformation or translation model stored therein or executed in accordance therewith may be employed for any speech translation, recognition or optimization. While one illustrative example described herein shows ASR and MT, other systems and method may employ the teachings in accordance with the present principles.

A system 400 includes an upstream component 402 which may include an ASR, a combining component or any other component in speech recognition, speech translation or any other suitable application. A bridging module 404 is connected between the upstream component 402 and a downstream component 406. The downstream component 406 may include a machine translation engine, a text to speech module or any other component in speech recognition, speech translation or any other suitable application.

The bridging module 404 includes a transformation or possibly a translation model 410. The model 410 is composed of one or more transformation features 412. These features may include tables, dictionaries, inventories or other models, which may be employed in transforming the output of the upstream component 402 to an input that is more compatible with the down stream component 406.

Figure 5:
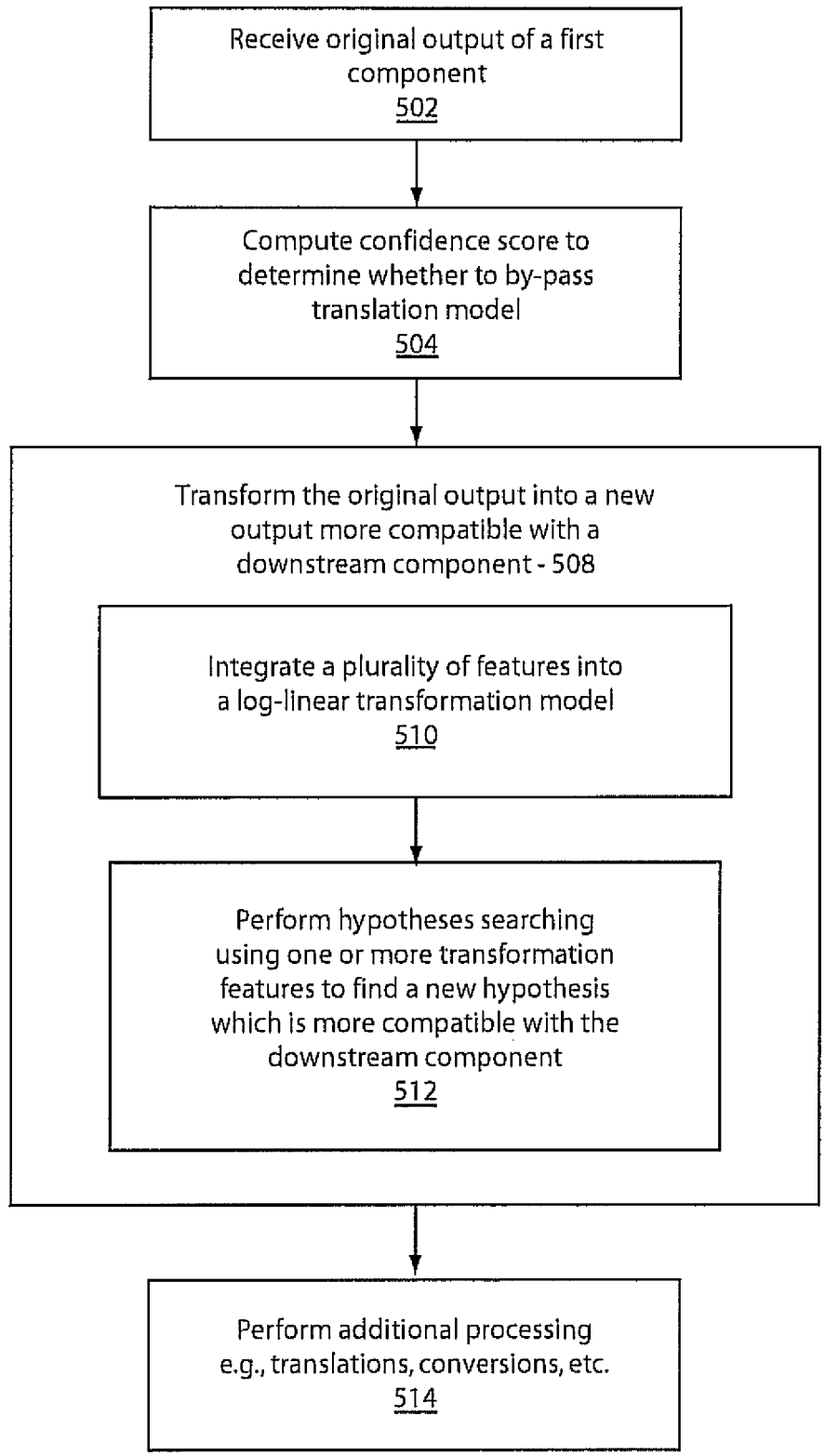
FIG. 5 is a block/flow diagram showing a system/method for translating speech in accordance with another embodiment.

Referring to FIG. 5, a system/method for speech translation is illustratively depicted. In block 502, an original output from a first component is received. In block 504, a confidence score may be computed to determine whether the transformation model can be by-passed.

In block 508, the original output is transformed into a new output that is more easily translated by a second component. The transforming includes integrating a plurality of features in a log-linear transformation model in block 510. Hypotheses searching is performed in block 512, using one or more transformation features which are applied to the original hypothesis to transform the original hypothesis into a new hypothesis for processing by the second component. The one or more transformation features may include one or more of a phonetic similarity table and/or a phrase confusion table configured to provide a phonetically similar hypotheses to the original hypotheses; a language model and/or a phrase paraphrase inventory to provide a grammatically correct and semantically meaningful hypotheses that is understandable to the second component; and/or a translation comfortability table to measure how comfortable the second component is translating the new hypotheses. In block 514, additional processing is performed in accordance with the given application. This may include for example, conversions, translations of speech or text, etc.

Having described preferred embodiments of a system and method for applying bridging models for robust and efficient speech to speech translation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for speech translation, comprising:
 a bridge module connected between a first component and a second component, the bridge module including:
 a processor; and
 a transformation model configured to receive an original hypothesis output from a first component, the transformation model comprising one or more transformation features configured to use the processor to transform the original hypothesis into a new hypothesis that is more easily translated by the second component based on an expected comfortability analysis and that is phonetically similar to the original hypothesis.

2. The system as recited in claim 1, wherein the transformation model includes at least one of a phonetic similarity table and a phrase confusion table configured to provide a new hypothesis that is phonetically similar to the original hypothesis.

3. The system as recited in claim 1, wherein the transformation model includes at least one of a language model and a phrase paraphrase inventory to provide a grammatically correct and semantically meaningful hypotheses that is understandable to the second component.

4. The system as recited in claim 1, wherein the transformation model includes a translation comfortability table to measure how comfortable the second component is translating the new hypotheses.

5. The system as recited in claim 1, wherein the first component includes an automatic speech recognition engine to generate the original hypothesis.

6. The system as recited in claim 1, wherein the second component includes a machine translation engine which receives the new hypothesis.

7. The system as recited in claim 1, wherein the first component includes a combining component and the second component includes a text to speech engine.

8. The system as recited in claim 1, wherein the transformation model integrates the one or more transformation features in a log-linear transformation model.

9. The system as recited in claim 1, further comprising a decoder configured to carry out hypotheses in accordance with the transformation model.

10. The system of claim 1, wherein the phonetic similarity is determined based on an edit distance.

11. A system for speech translation, comprising:
an automatic speech recognition (ASR) engine configured to receive utterances in a first language and decode the utterances to generate an original hypothesis;
a bridge module connected to the ASR engine, the bridge module comprising a processor and being configured to receive the original hypothesis output from ASR engine;
a transformation model included in the bridge module, the transformation model including one or more transformation features which use the processor and are applied to the original hypothesis to transform the original hypothesis into a new hypothesis that is based on an expected comfortability analysis and that is phonetically similar to the original hypothesis; and
a machine translation (MT) engine connected to the bridge module and configured to translate the new hypothesis into a second language, the new hypothesis being generated to be more easily translated by the MT engine.

12. The system as recited in claim 11, wherein the transformation model includes at least one of a phonetic similarity table and a phrase confusion table configured to provide a new hypothesis that is phonetically similar to the original hypothesis.

13. The system as recited in claim 11, wherein the transformation model includes at least one of a language model and a phrase paraphrase inventory to provide a grammatically correct and semantically meaningful hypotheses that is understandable to the MT engine.

14. The system as recited in claim 11, wherein the transformation model includes a translation comfortability table to measure how comfortable the MT component is translating the new hypotheses.

15. The system as recited in claim 11, wherein the MT engine includes a plurality of MT engines, the plurality of MT engine each connected to a corresponding bridge module connected to the ASR engine.

16. The system as recited in claim 15, further comprising a combining component configured to combine the outputs of the plurality of MT engines.

17. The system as recited in claim 16, further comprising an additional bridge module connected between the combining component and the text to speech translator, the additional bridge module being configured to transform the combining component output for the text to speech translator.

18. The system as recited in claim 11, wherein the transformation model integrates the one or more transformation features in a log-linear transformation model.

19. The system as recited in claim 11, further comprising a decoder configured to carry out hypotheses searching in accordance with the transformation model.

20. A method for speech translation, comprising:
receiving an original output from a first component;
transforming the original output into a new output that is more easily translated by a second component based on an expected comfortability analysis and that is phonetically similar to the original hypothesis wherein the transforming includes:
integrating a plurality of features in a log-linear transformation model; and
hypotheses searching using one or more transformation features which are applied to the original hypothesis to transform the original hypothesis into a new hypothesis for processing by the second component.

21. The method as recited in claim 20, wherein the one or more transformation features includes at least one of a phonetic similarity table and a phrase confusion table configured to provide a new hypothesis that is phonetically similar to the original hypothesis.

22. The system as recited in claim 20, wherein the one or more transformation features includes at least one of a language model and a phrase paraphrase inventory to provide a grammatically correct and semantically meaningful hypotheses that is understandable to the second component.

23. The method as recited in claim 20, wherein the one or more transformation features includes a translation comfortability table to measure how comfortable the second component is translating the new hypotheses.

24. The method as recited in claim 20, further comprising computing a confidence score to determine whether the transformation model can be by-passed.

25. A computer readable storage medium comprising a computer readable program for speech translation, wherein the computer readable program when executed on a computer causes the computer to perform the steps of:
receiving an original output from a first component;
transforming the original output into a new output that is more easily translated by a second component based on an expected comfortability analysis and that is phonetically similar to the original hypothesis wherein the transforming includes:
integrating a plurality of features in a log-linear transformation model; and
hypotheses searching using one or more transformation features which are applied to the original hypothesis to transform the original hypothesis into a new hypothesis for processing by the second component.

* * * * *